(12) United States Patent
O'Neill et al.

(10) Patent No.: US 7,823,480 B2
(45) Date of Patent: Nov. 2, 2010

(54) SUPPORT BRACKET WITH AN INTEGRATED SWITCH FOR A PEDAL ASSEMBLY

(75) Inventors: Dan O'Neill, Chatham (CA); Peter Mischenko, Hawkestona (CA)

(73) Assignee: KSR Technologies Co., Ridgetown (CA)

( * ) Notice: Subject to any disclaimer, the term of this patent is extended or adjusted under 35 U.S.C. 154(b) by 798 days.

(21) Appl. No.: 10/599,960

(22) PCT Filed: Jul. 6, 2004

(86) PCT No.: PCT/IB2004/002216

§ 371 (c)(1), (2), (4) Date: Jun. 26, 2007

(87) PCT Pub. No.: WO2005/028268

PCT Pub. Date: Mar. 31, 2005

(65) Prior Publication Data

US 2007/0277642 A1    Dec. 6, 2007

Related U.S. Application Data

(60) Provisional application No. 60/484,874, filed on Jul. 3, 2003.

(51) Int. Cl.
G05G 1/30    (2008.04)
(52) U.S. Cl. .......................................... 74/512; 74/560
(58) Field of Classification Search ........... 74/512–514, 74/560; 188/325, 335; 324/207.2
See application file for complete search history.

(56) References Cited

U.S. PATENT DOCUMENTS 6,101,896 A    8/2000    Engelgau

| | | | |
|---|---|---|---|
| 6,426,619 B1 * | 7/2002 | Pfaffenberger et al. ... | 324/207.2 |
| 6,460,429 B1 * | 10/2002 | Staker ........................ | 74/513 |
| 6,584,871 B2 | 7/2003 | Burton et al. | |
| 6,918,318 B2 | 7/2005 | Willemsen | |
| 7,051,616 B2 * | 5/2006 | Yokochi et al. ............... | 74/513 |

(Continued)

FOREIGN PATENT DOCUMENTS

EP    0680863    11/1995

(Continued)

OTHER PUBLICATIONS

English Abstract of EP 0 680 863 A1, Doullet, Nov. 8, 1995.*

*Primary Examiner*—Vinh T. Luong
(74) *Attorney, Agent, or Firm*—Gifford, Krass, Sprinkle, Anderson & Citkowski, P.C.

(57) ABSTRACT

A brake pedal assembly, for use in a vehicle, includes a support bracket, a first and second side walls extending outwardly from the support bracket. The first side wall includes an integral switch portion having a pair of generally parallel arcuate slots. A pedal arm, having a pair of contact posts positioned to extend through the pair of arcuate slots, is pivotally mounted between the first and second side walls. A conductive strip interconnects each of the pair of contact posts. The support bracket further includes a switch cover plate enclosing the integral switch portion of the first side wall. An electronic switch is disposed on an inside surface of the cover plate, and comes into electrical communication with the conductive strip as the contact posts travel within the arcuate slot in response to movement of the pedal arm, to send an electrical signal to an associated vehicle component.

13 Claims, 2 Drawing Sheets

U.S. PATENT DOCUMENTS

| | | | |
|---|---|---|---|
| 7,353,729 B2 * | 4/2008 | Willemsen et al. | 74/512 |
| 2003/0111328 A1 | 6/2003 | Kasakawa et al. | |
| 2006/0169097 A1 * | 8/2006 | Peniston et al. | 74/564 |
| 2009/0038431 A1 * | 2/2009 | Willemsen et al. | 74/512 |

FOREIGN PATENT DOCUMENTS

| | | | |
|---|---|---|---|
| WO | WO 2004/007929 A2 * | 1/2004 | 74/512 |

* cited by examiner

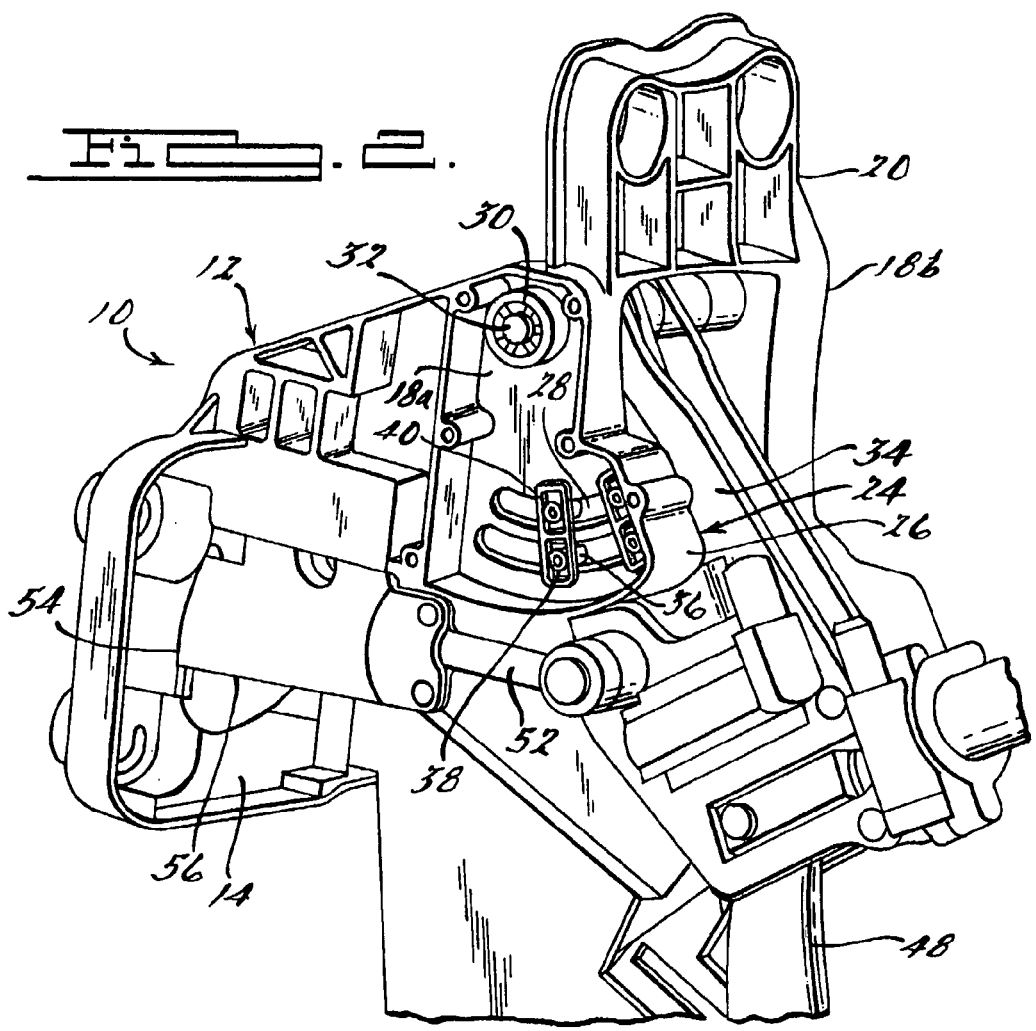
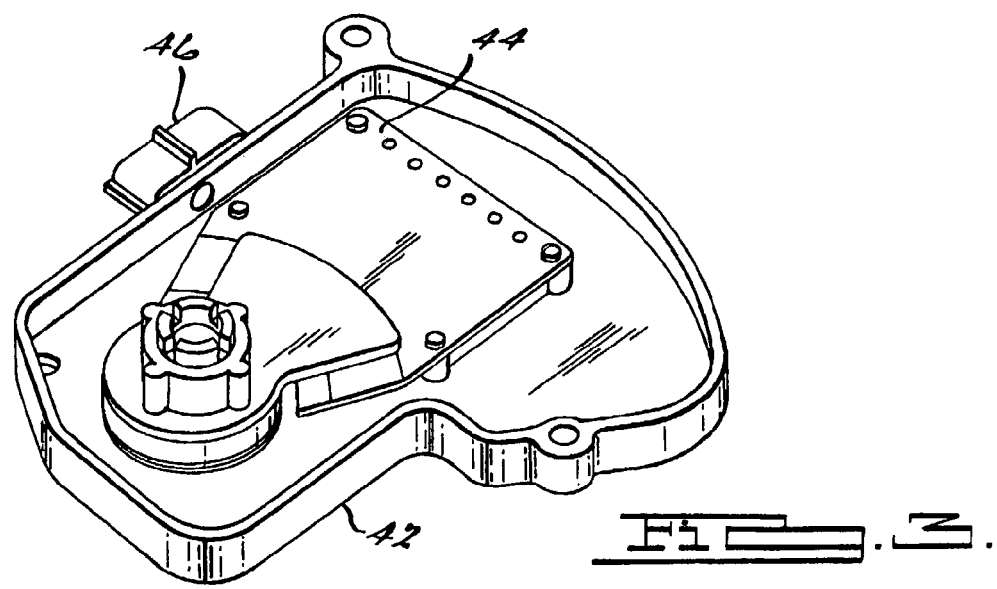

SUPPORT BRACKET WITH AN INTEGRATED SWITCH FOR A PEDAL ASSEMBLY

RELATED APPLICATION

This application claims priority of U.S. Provisional Patent Application Ser. No. 60/484,874 filed Jul. 3, 2003, which is incorporated herein by reference.

BACKGROUND OF THE INVENTION

The present invention relates generally to brake pedals, and more specifically, to a brake pedal assembly with a support bracket having an integrated switch.

Vehicles, and in particular automotive vehicles, include a brake system for controlling the movement of the vehicle. Conventional brake systems include a brake pedal for transmitting a braking force from the vehicle operator to the wheels of the vehicle. The brake pedal is operatively coupled to a brake booster via a push rod. The brake booster is operatively connected to a master cylinder, and the master cylinder is operatively connected to a braking mechanism via brake lines. The braking mechanism is operatively coupled to a wheel of the vehicle and applies the braking force to the wheel to slow down the rotational movement of the wheel.

The brake system also includes various switches that work in conjunction with components associated with the brake system. One example of a switch is a brake light switch that activates a brake light when the brake pedal is depressed. Another example of a switch is a cruise control switch that deactivates the cruise control system when the brake pedal is depressed. In the past, these switches were each separately mounted to the support bracket in order to sense movement of the brake pedal. However, the mounting of one or more switches in this manner is cumbersome, and requires expensive assembly operations.

Thus, there is a need in the art for a brake pedal assembly in which the switches associated with the brake pedal are integrally included with the support bracket.

SUMMARY OF THE INVENTION

Accordingly, the present invention is a support bracket for a brake pedal assembly with an integral switch for a vehicle. The support bracket includes a generally planar mounting face having at least one aperture for securing the support bracket to the vehicle. The support bracket also includes a radially extending first side wall and second side wall spaced a predetermined distance apart from the first side wall. A portion of the first side wall forms an integral switch housing and contains two generally parallel arcuate slots. The brake pedal assembly further includes a pivot means operatively supported between the first and second side walls, a pedal arm pivotally mounted onto the pivot means, and a pedal link pivotally mounted onto the pivot means, and operatively connected to the pedal arm. At least one pair of contact posts is disposed on the pedal link and positioned to extend therethrough the corresponding arcuate slot in the integral switch housing. A conductive strip operatively interconnects each contact post in the pair of contact posts. A brake booster means is operatively attached to both the pedal link and the housing. The support bracket further includes a switch housing cover enclosing the integral switch housing. A switching means is operatively disposed on an inside surface of the cover, and is in electrical communication with the contact posts as the contact posts travel within the arcuate slot in response to movement of the pedal arm, to electrically communicate between the switching means and an associated vehicle component.

One advantage of the present invention is that a support bracket with an integral switch is provided for a brake assembly that improves packaging of the brake pedal assembly. Another advantage of the present invention is that a support bracket with an integral switch is provided for a brake assembly that is easier to install on the vehicle. A further advantage of the present invention is that a support bracket with an integral switch is provided for a brake assembly that is more cost effective to manufacture. Still a further advantage of the present invention is that a support bracket is provided that can be adapted for use on a throttle or clutch pedal.

Other features and advantages of the present invention will be readily appreciated as the same becomes better understood after reading the subsequent description taken in conjunction with the accompanying drawings.

BRIEF DESCRIPTION OF THE DRAWINGS

FIG. 2 is another perspective view of the brake pedal assembly of FIG. 1 without the switch housing cover, according to the present invention.

FIG. 3 is a perspective view of the switch housing cover for the brake pedal assembly of FIG. 1, according to the present invention.

DESCRIPTION OF THE INVENTION

Figure 1:
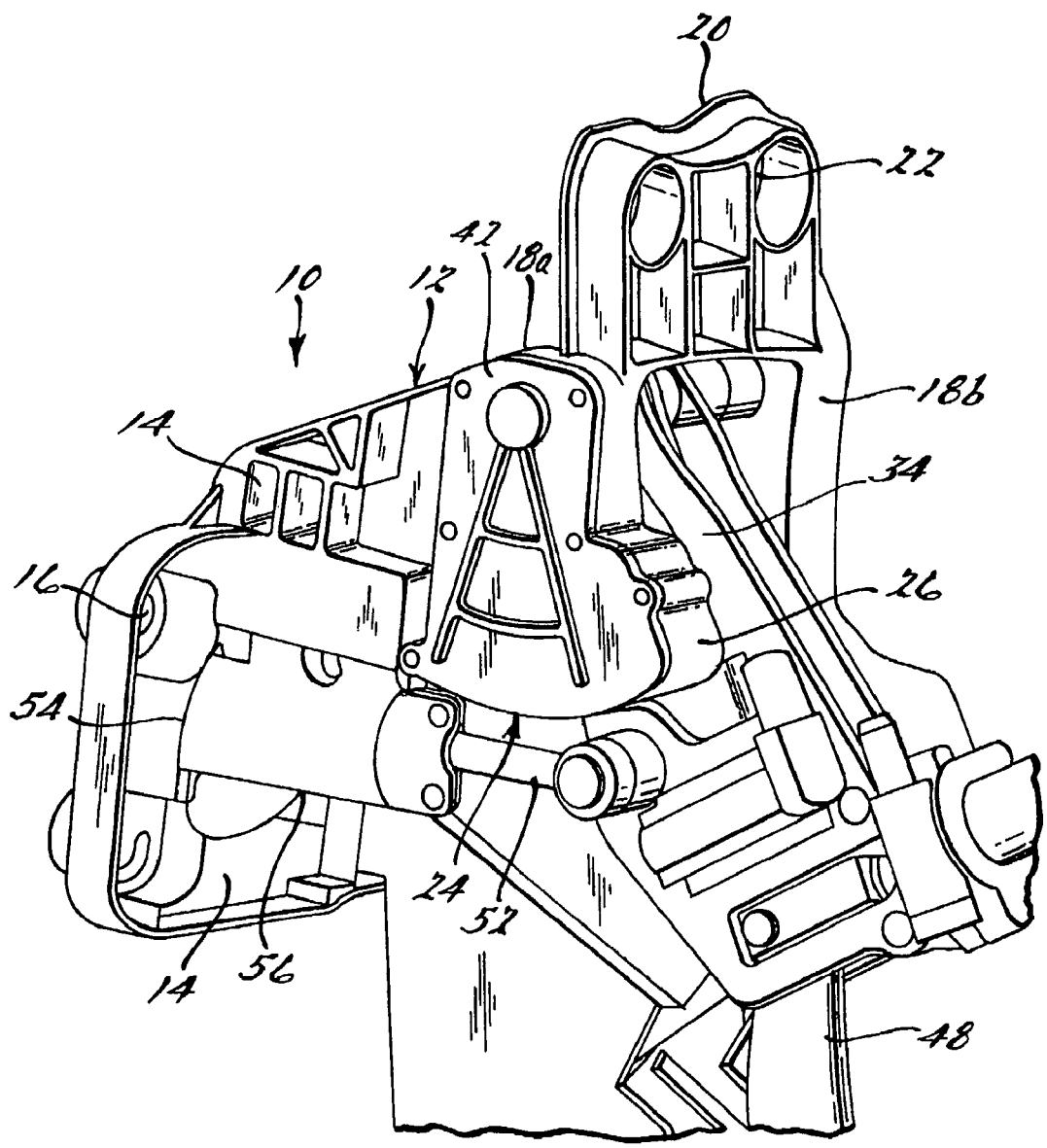
FIG. 1 is a partial perspective side view of a brake pedal assembly with an integral switch, according to the present invention.

Referring to FIGS. 1-3, a brake pedal assembly 10 with a support bracket having an integral switch for translating a signal between a vehicle operator or driver (not shown) and a brake actuating mechanism (not shown) is illustrated. As is known in the art, the brake pedal assembly 10 is part of a comprehensive brake system for slowing down the vehicle. It should be appreciated that the brake pedal assembly 10 may be either a fixed height brake pedal assembly or an adjustable height brake pedal assembly. In this example, an adjustable height pedal is illustrated. An example of an adjustable height brake pedal assembly is disclosed in commonly assigned U.S. patent application Ser. No. 09/882,981, which is incorporated herein by reference. In addition, the brake system may either be a conventional mechanical brake system or an electronic brake system. It should also be appreciated that the support bracket with integral switch may be utilized on other types of pedals, such as the accelerator pedal or clutch pedal or the like.

The brake pedal assembly 10 is fixedly mounted to the vehicle in a conventional position beneath the instrument panel. The brake pedal assembly 10 includes a support bracket 12 for attaching the brake pedal assembly 10 to a dash panel portion of the vehicle. The support bracket 12 includes a generally planar mounting face 14 having a plurality of apertures 16 for attaching the support bracket 12 to the vehicle, such as by bolting.

The support bracket 12 also includes two spaced apart side walls 18, a first side wall 18a and a second side wall 18b extending radially from the mounting face 14. The upper end of the first and second side walls 18a, 18b are interconnected by an upwardly extending upper wall 20. The upper wall 20 is spaced a predetermined distance apart from the mounting face 14. The upper wall 20 includes a plurality of apertures 22 for fixedly mounting the support bracket 12 to a portion of the vehicle. The first and second side walls 18a, 18b also include an aperture 30 for receiving a pivot pin 32 at a pedal arm pivot point. The brake pedal arm is supported between the first and second side walls 18a, 18b on the pivot pin 32 in a manner to be described.

The support bracket 12 includes a switch 24 integrally formed on an exterior portion of the first side wall 18a. The switch 24 has an outwardly projecting wall 26 that defines the perimeter of the integral switch 24. At least one arcuate slot 28 is located in the first side wall 18a, within the switch wall 26 perimeter. There are two substantially parallel arcuate slots 28. In this example, the slots are positioned in a radial direction below the pivot point, which is also within the switch wall 26 perimeter.

The switch 24 also includes a pair of contact posts 36 disposed on a pedal link (to be described). It should be appreciated that there is a pair of posts 36 associated with each switch. The posts 36 are arranged so as to extend therethrough a corresponding slot 28 in the first side wall 18a of the support bracket 12. Preferably, the posts 36 move freely within the slots 28 when the brake pedal is actuated. The switch 24 also includes an electrically conductive means, such as a conductive strip 38 or the like, interconnecting each post 36 of the corresponding pair of posts. Each conductive strip 38 includes a plurality of wire brushes 40 disposed on an outer surface, for making electrical contact in a manner to be described. Another example of a conductive means is a receiving coil.

The switch 24 also includes a cover plate 42 that is secured to the switch wall 26, as shown in FIG. 2. For example, the cover 42 may be secured to the switch wall 26 using a fastener, such as a screw or the like. The cover 42 is configured to conform to the shape of the switch wall 26. As shown in FIG. 3, the other components for the switch are mounted to an inside surface of the cover 42. In this example, a switching means, such as a circuit board 44 is fixedly mounted to the cover 42.

The cover 42 may also include an integrally formed connector 46 for electrically connecting the switch 24 to the particular component operated by the switch 24. Various types of components are contemplated. For example, each pair of contact posts 36 may be connected to a brake light circuit or a cruise control deactivation circuit, or a brake interlock circuit, or a clutch circuit or a brake by wire circuit.

Each pair of contact posts 36 has a corresponding electrical contact means on the circuit board. The circuit board contact means is preferably mounted a few degrees along an arc from the initial starting position. Thus, when the brake pedal is depressed, the strip 38 and contact posts 36 move through the arcuate slot to electrically connect the pairs of contacts to close the electrical circuits. The electrical contact on the circuit board results in the activation of the associated component, such as the brake light or cruise control deactivation, or brake interlock or brake by wire.

The brake pedal assembly 10 includes a pivot pin 32 extending therebetween the side walls 18. The pivot pin 32 pivotally supports a pedal arm 48, and in particular an upper end of the pedal arm 48, about a pivot axis. Preferably, the brake pedal assembly 10 includes a torsion spring (not shown) operatively disposed on the pivot pin 32 for controlling the movement of the brake pedal assembly 10 between a resting and braking position, as is known in the art.

The brake pedal assembly 10 further includes a pair of pivotally interconnected pedal links 34. Each pedal link 34 is a generally planar member. A first end of the pedal link 34 is pivotally supported by the pivot pin 32. It should be appreciated that in this example, there are two pedal links 34, with each positioned on either side of the pedal arm 48. Advantageously, the use of two pedal links 34 better distributes the load transferred to a brake rod booster rod from the pedal arm 48. The opposite end of the pedal link 34 supports a drive mechanism for adjusting an initial position of the pedal arm 48. An example of such an adjustable pedal assembly is disclosed in commonly assigned U.S. patent Ser. No. 10/204,725, which is incorporated herein by reference.

The brake pedal assembly further includes a brake booster rod 52 secured to the pedal link 34. It should be appreciated that the brake booster rod 52 is operatively attached to the brake booster, as is known in the art, and transmits the force of the operator applying the brakes from the brake pedal assembly 10 to the braking system. The brake rod 52 extends through an aperture 54 in the mounting face 14 of the support bracket 12.

Alternatively, the brake rod is operatively attached to a brake hysteresis mechanism 56. This mechanism may also be attached to the support bracket 12, such as the second side wall 18b in this example. The brake booster hysteresis mechanism 56 is used for a brake by wire application to simulate the "feel" of the applied braking force.

It should be appreciated that the brake pedal assembly 10 may include other components, as is known in the art. For example, the brake pedal assembly 10 may include a stop (not shown) extending therebetween the side walls 18 of the support bracket 12 over the pivot pin 20, to position the pedal links 34 when the pedal arm 48 is in a resting position. The brake pedal assembly 10 further includes a pedal pad (not shown) mounted to a lower end of the pedal arm 48. The pedal pad provides a pedal actuation point for operating the pedal assembly.

In operation, as the driver depresses the pedal pad, the pedal arm 48 and pedal links 34 pivot about the pedal arm pivot point. The movement of the pedal links 34 causes the contact posts 36 to travel through the slots 28. At the same time, when the brushes 40 on the strip 38 come into electrical contact with a corresponding contact on the circuit board 44, an electrical connection is made. A signal is transmitted to the corresponding component, such as the brake light or cruise control, to implement the desired action. It should be appreciated that the switch senses the rotary movement of the pedal arm, and transmits this motion to the switch to implement the desired action.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

The invention claimed is:

1. A brake pedal assembly for a vehicle, said brake pedal assembly comprising:

a support bracket having a generally planar mounting face;

a first side wall and a second side wall spaced a predetermined distance apart from said first side wall, said first side wall and said second side wall extending outwardly from said mounting face, wherein an integral switch portion of said first side wall contains a pair of generally parallel arcuate slots;

a pedal arm pivotally mounted between said first side wall and said second side wall;

at least one pair of contact posts disposed on said pedal arm and positioned such that each of said pair of contact posts extends through a corresponding one of said pair of arcuate slots in said integral switch portion of said first side wall;

a conductive strip interconnecting each of said pair of contact posts; and a switch cover plate secured to said first side wall, wherein an electronic switch is operatively disposed on an inside surface of said cover plate, and said pair of contact posts travels within said pair of arcuate slots in response to movement of said pedal arm to electrically actuate said switch and send an electrical signal to a component in communication with said integral switch portion.

2. The brake pedal assembly as set forth in claim 1 wherein said first side wall includes an outwardly projecting switch wall defining a perimeter of the integral switch portion of said first side wall, and said switch cover plate is secured to said switch wall.

3. The brake pedal assembly as set forth in claim 1 wherein said switch cover plate includes an integrally formed connector for electrically connecting said switch to said component in communication with said integral switch portion.

4. The brake pedal assembly as set forth in claim 1 further comprising an upper wall interconnecting said first side wall and said second side wall, wherein said upper wall is generally parallel to and spaced a predetermined distance from said mounting face and said upper wall includes at least one aperture for securing said support bracket to the vehicle.

5. The brake pedal assembly as set forth in claim 1 wherein said switch is a printed circuit board.

6. The brake pedal assembly as set forth in claim 1, wherein said pedal arm is pivotally mounted to a pivot pin mounted between said first side wall and said second side wall.

7. The brake pedal assembly as set forth in claim 6, wherein a first pedal link is pivotally mounted onto said pivot pin between said first side wall and said pedal arm, and a second pedal link is pivotally mounted onto said pivot pin between said pedal arm and said second side wall.

8. The brake pedal assembly as set forth in claim 7, wherein said pair of contact posts extend from said first pedal link.

9. A brake pedal assembly for a vehicle, said brake pedal assembly comprising:

a support bracket having a generally planar mounting face, wherein said mounting face includes at least one aperture for securing said support bracket to the vehicle;

a first side wall and a second side wall spaced a predetermined distance apart from said first side wall, said first side wall and said second side wall extending outwardly from said mounting face, wherein an integral switch portion of said first side wall includes an outwardly projecting switch wall defining a perimeter of said integral switch portion, and said first side wall having a pair of generally parallel arcuate slots contained within said switch wall;

a pivot pin operatively supported between said first side wall and said second side wall;

a pedal arm pivotally mounted onto said pivot pin between said first side wall and said second side wall;

a pedal link pivotally mounted onto said pivot pin, between said first side wall and said pedal arm and operatively connected to said pedal arm, wherein said pedal link is a generally planar member;

at least one pair of contact posts disposed on said pedal link and positioned such that each of said pair of contact posts extends through a corresponding one of said pair of arcuate slots in said integral switch portion of said first side wall;

a conductive strip interconnecting each of said pair of contact posts, wherein said conductive strip includes a plurality of brushes; and a switch cover plate secured to said switch wall, wherein an electronic switch is operatively disposed on an inside surface of said switch cover plate, and said pair of contact posts travels within said pair of arcuate slot in response to movement of the pedal arm to electrically actuate said switch and send an electrical signal to a component in communication with the integral switch.

10. The brake pedal assembly as set forth in claim 9 wherein said switch cover plate includes an integrally formed connector for electrically connecting said switch to said component in communication with said integral switch portion.

11. The brake pedal assembly as set forth in claim 9 further comprising an upper wall interconnecting said first side wall and said second side wall, wherein said upper wall is generally parallel to and spaced a predetermined distance from said mounting face and said upper wall includes at least one aperture for securing said support bracket to the vehicle.

12. The brake pedal assembly as set forth in claim 9 wherein said switch is a printed circuit board.

13. A brake pedal assembly for a vehicle, said brake pedal assembly comprising:

a support bracket secured to the vehicle, said support bracket having a pair of generally parallel arcuate slots formed therein;

a pedal arm pivotally mounted to said support bracket about a pivot axis, said pedal arm having a pair of contact posts extending outwardly therefrom and positioned such that each of said pair of contact posts extends through one of said pair of arcuate slots;

a conductive strip interconnecting each of said pair of contact posts; and a switch cover plate attached to said support bracket, said switch cover plate having an inner surface and an electronic switch disposed on said inner surface;

wherein upon movement of said pedal arm about said pivot axis said pair of contact posts rotate about said pivot axis within said pair of arcuate slots to electronically connect said conductive strip to said switch and send an electronic signal to a component in communication with said switch.

* * * * *